US007421463B2

(12) United States Patent
Umeno

(10) Patent No.: US 7,421,463 B2
(45) Date of Patent: Sep. 2, 2008

(54) RANDOM SEQUENCE GENERATING APPARATUS, ENCRYPTION/DECRYPTION APPARATUS, RANDOM SEQUENCE GENERATING METHOD, ENCRYPTION/DECRYPTION METHOD AND PROGRAM

(75) Inventor: Ken Umeno, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 660 days.

(21) Appl. No.: 10/803,587

(22) Filed: Mar. 17, 2004

(65) Prior Publication Data

US 2004/0184609 A1 Sep. 23, 2004

(30) Foreign Application Priority Data

Mar. 19, 2003 (JP) ............................. 2003-075438

(51) Int. Cl.
*G06F 7/58* (2006.01)
(52) U.S. Cl. ..................................................... 708/250
(58) Field of Classification Search .......... 708/250–256
See application file for complete search history.

(56) References Cited

U.S. PATENT DOCUMENTS

| 5,920,625 | A | * | 7/1999 | Davies ........................ 380/210 |
| 6,014,446 | A | * | 1/2000 | Finkelstein ................. 708/252 |
| 6,339,645 | B2 | * | 1/2002 | Smeets ........................ 708/250 |
| 7,035,408 | B2 | * | 4/2006 | Antoine ....................... 708/250 |
| 7,194,496 | B2 | * | 3/2007 | Morris ........................ 708/250 |
| 2005/0033785 | A1 | * | 2/2005 | Umeno et al. ............... 708/250 |

FOREIGN PATENT DOCUMENTS

| EP | 1289186 A2 | 3/2003 |
| JP | 2004-126915 | 4/2004 |

OTHER PUBLICATIONS

"Improvement on Dynamic Psuedo-random Sequence Encrypting Method and Application Thereof," Journal of Saming College, vol. 18, No. 2, pp. 117-118, Jun. 2001.
Office Action dated Aug. 10, 2007 for co-pending Chinese Application No. 200410045111.0.

* cited by examiner

*Primary Examiner*—Tan V. Mai
(74) *Attorney, Agent, or Firm*—Mitchell P. Brook; Luce, Forward, Hamilton & Scripps

(57) ABSTRACT

Disclosed is a random sequence generating apparatus for generating a sequence of integers. A seed receiving section receives a sequence of integers as a seed. An initialization section provides a transformation section with the received sequence of integers. The transformation section performs predetermined transformation on each of the provided integer sequence to acquire a sequence of integers. A rotation section acquires the number of rotation bits from a part of the acquired sequence of integers, performs a rotation operation on the acquired number of rotation bits with respect to all of or part of the sequence of integers taken as a bit sequence, and acquires a sequence of integers. An updating section provides the transformation section with the sequence of integers. An output section outputs part of a sequence of integers obtained last as a random sequence in case where transformation and rotation are repeated a predetermined number of times.

14 Claims, 6 Drawing Sheets

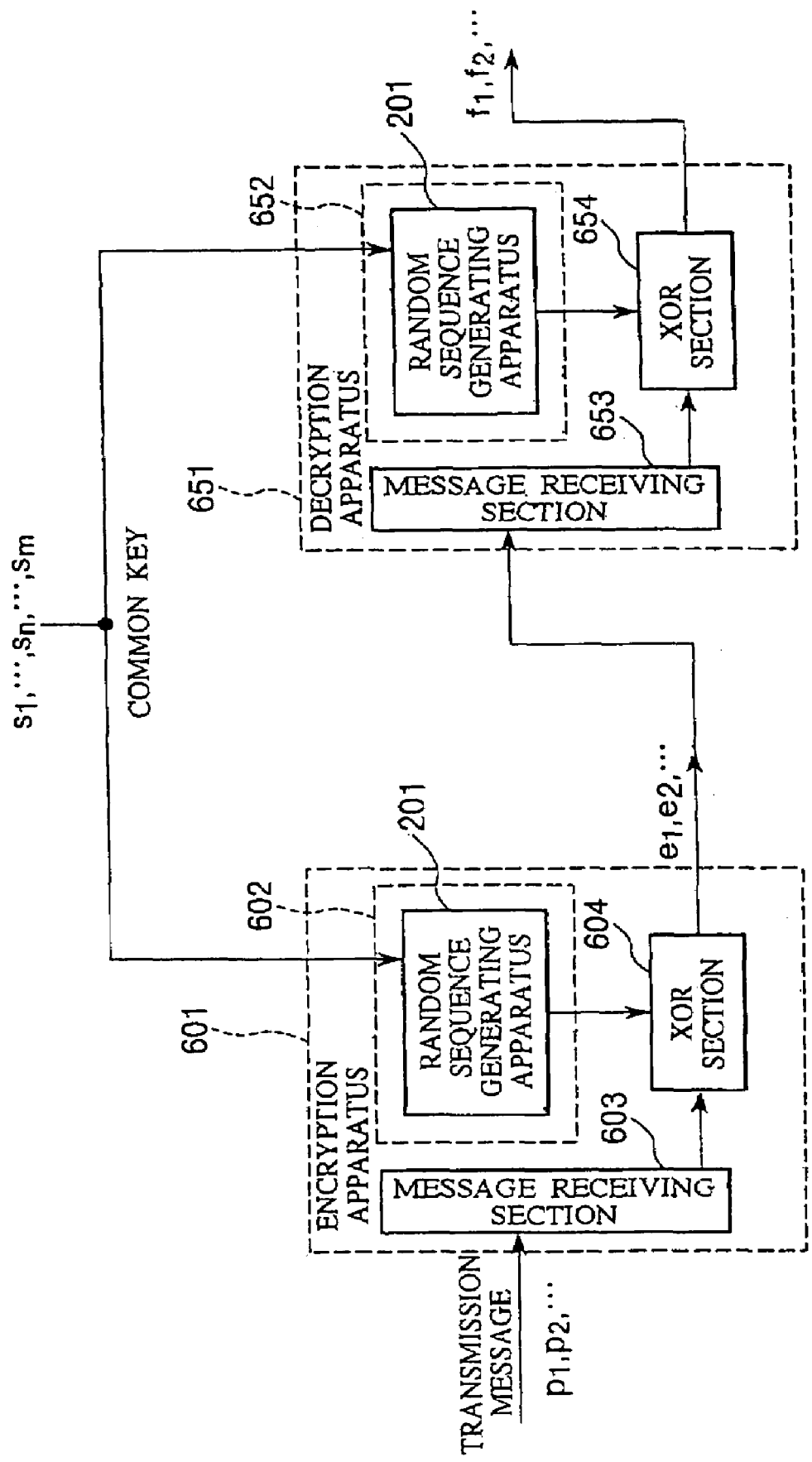

US 7,421,463 B2

RANDOM SEQUENCE GENERATING APPARATUS, ENCRYPTION/DECRYPTION APPARATUS, RANDOM SEQUENCE GENERATING METHOD, ENCRYPTION/DECRYPTION METHOD AND PROGRAM

BACKGROUND OF THE INVENTION

1. Field of the Invention

The present invention relates to a random sequence generating apparatus, an encryption/decryption apparatus, a random sequence generating method, an encryption/decryption method and a program.

2. Description of the Related Art

Various random sequence generating techniques have been proposed so far. Random numbers acquired by those techniques are used in, for example, simulation of various kinds of physical phenomena and chemical phenomena in the Monte Carlo analysis and a block encryption system for privacy communications.

It is desirable in those random sequence generating techniques to satisfy various properties such that the distribution of values included in an acquired random sequence should be uniform, the frequency of occurrence of "0" and "1" of a predetermined bit in a numerical expression of the values in a computer should have been as less lopsided as possible when one sees only this predetermined bit, and the period of a random sequence should be as long as possible.

SUMMARY OF THE INVENTION

Accordingly, it is an object of the invention to provide a random sequence generating apparatus and random sequence generating method, which generate a sequence of random numbers having a preferably property as a random sequence, an encryption/decryption apparatus and encryption/decryption method which uses the random sequence generating apparatus and method, and a program which achieves those apparatuses and methods using a computer.

To achieve the object, according to the first aspect of the invention, there is provided a random sequence generating apparatus that generates a sequence of integers of w bits and comprises a seed receiving section, an initialization section, a transformation section, a rotation section, an updating section and an output section, which are designed as follows.

The seed receiving section receives a sequence of integers $s_1, s_2, \ldots, S_n, \ldots, s_m$ of w bits as a seed for integers n and m ($1 \leq n \leq m-1$).

The initialization section provides the transformation section with the received sequence of integers $s_1, s_2, \ldots, S_n, \ldots, s_m$ as an integer sequence $x_1, x_2, \ldots, x_n, \ldots, x_m$.

The transformation section performs predetermined transformation on each of the provided integer sequence $x_1, x_2, \ldots, x_n, \ldots, x_m$ to acquire a sequence of integers $y_1, y_2, \ldots, y_n, \ldots, y_m$ of w bits.

The rotation section acquires a number of rotation bits from the sequence of integers $y_{n+1}, \ldots, y_m$, performs a rotation operation on the acquired number of rotation bits with respect to all of or a part of the sequence of integers $y_1, y_2, \ldots, y_n, \ldots, y_m$ taken as a bit sequence of wm bits, and acquires a sequence of integers $z_1, z_2, \ldots, z_n, \ldots, z_m$ of w bits from the acquired bit sequence of wm bits.

The updating section provides the transformation section with the sequence of integers $z_1, z_2, \ldots, z_n, \ldots, z_m$ as the integer sequence $x_1, x_2, \ldots, x_n, \ldots, x_m$.

The output section outputs a sequence of integers $z_1, z_2, \ldots, z_n$ or $z_{n+1}, \ldots, z_m$ obtained last as a random sequence $r_1, r_2, \ldots, r_n$ or $r_1, r_2, \ldots, r_{m-n}$ respectively in case where transformation in the transformation section and rotation in the rotation section are repeated a predetermined number of times.

In the random sequence generating apparatus, the transformation section performs transformation by recursion formulae given below for an integer i ($1 \leq i \leq m-1$) using mapping $g(\bullet, \bullet)$ $$y_1 = g(x_m, x_1)$$

$$y_{i+1} = g(x_i, x_{i+1}).$$

In the random sequence generating apparatus, the transformation section can perform transformation by recursion formulae given below for an integer i ($1 \leq i \leq m-1$) using mapping $g(\bullet, \bullet)$ $$y_1 = g(x_m, x_1)$$

$$y_{i+1} = g(x_i, x_{i+1}).$$

Alternatively, in the random sequence generating apparatus, the transformation section can perform transformation by recursion formulae given below for an integer i ($1 \leq i \leq m-1$) using a predetermined integer c and mapping $g(\bullet, \bullet)$ $$y_1 = g(c, x_1)$$

$$y_{i+1} = g(y_i, x_{i+1}).$$

In the random sequence generating apparatus, the transformation section can also perform transformation by recursion formulae given below for an integer i ($1 \leq i \leq m-1$) using mapping $g(\bullet, \bullet)$ $$y_1 = g(c, x_1)$$

$$y_{i+1} = g(x, x_{i+1}).$$

In any one of the random sequence generating apparatuses, the mapping $g(\bullet, \bullet)$ can be defined as $$g(a, b) = 2b^2 + h(a)b + q \pmod{2^w}$$

from predetermined mapping $h(\bullet)$ and a predetermined integer q ($0 \leq q \leq 2^{w-1}$).

In the random sequence generating apparatus, the mapping $h(\bullet)$ is defined as $$h(a) = a.$$

In the random sequence generating apparatus, the mapping $h(\bullet)$ can be defined by an operation of clearing a predetermined bit in a numerical expression of a given value.

In the random sequence generating apparatus, the mapping $h(\bullet)$ can be defined by an operation of inverting a predetermined bit in a numerical expression of a given value.

In the random sequence generating apparatus, the mapping $h(\bullet)$ can be defined by an operation of setting 01 to least significant two bits in a numerical expression of a given value.

In any one of the random sequence generating apparatuses, taking the sequence of integers $y_{n+1}, \ldots, y_m$ as a bit sequence of w(m−n) bits, the rotation section can acquire, as the number of rotation bits, an integer value equivalent to a bit sequence taken as an integer and obtained by arranging at least one bit at a predetermined position extracted from the bit sequence.

In the random sequence generating apparatus, taking the sequence of integers $y_{n+1}, \ldots, y_m$ as a bit sequence of w(m−n)

bits, the rotation section can determine a direction of rotation based on a value of a bit at a predetermined position in the bit sequence.

In any one of the random sequence generating apparatuses, the rotation section can acquire a number of rotation bits from the sequence of integers $y_{n+1}, \ldots, y_m$, can perform a rotation operation on the acquired number of rotation bits with respect to the sequence of integers $y_1, y_2, \ldots, y_n, \ldots, y_m$ taken as a bit sequence of wn bits, can acquire a sequence of integers $z_1, z_2, \ldots, z_n$ of w bits from the acquired bit sequence of wn bits, can perform a rotation operation on the acquired number of rotation bits with respect to the sequence of integers $y_{n+1}, \ldots, y_m$ taken as a bit sequence of w(m−n) bits, and can acquire a sequence of integers $z_{n+1}, \ldots, z_m$ of w bits from the acquired bit sequence of w(m−n) bits. That is, $z_i$ is $u_i$ undergone a rotation operation by a predetermined number of rotation bits.

According to the second aspect of the invention, there is provided an encryption/decryption apparatus comprising a rotation section, a message receiving section and an encryption/decryption section, which are designed as follows.

The random sequence generating section generates a random sequence $r_1, r_2, \ldots, r_n$ by means of the aforementioned random sequence generating apparatus.

The message receiving section receives a sequence of integers $p_1, p_2, \ldots$ of w bits as a message.

The encryption/decryption section outputs a sequence of integers $p_1$ xor $r_1$, $p_2$ xor $r_2$, $\ldots$, $p_i$ xor $r_{((i+n-1) \bmod n)+1}$ as a result of encryption or decryption.

According to the third aspect of the invention, there is provided a random sequence generating method that generates a sequence of integers of w bits and comprises a seed receiving step, an initialization step, a transformation step, a rotation step, an updating step and an output step, which are designed as follows.

The seed receiving step receives a sequence of integers $s_1, s_2, \ldots, s_n, \ldots, s_m$ of w bits as a seed for integers n and m ($1 \leq n \leq m-1$).

The initialization step provides the transformation step with the received sequence of integers $s_1 i, s_2, \ldots, s_n, \ldots, s_m$ as an integer sequence $x_1, x_2, \ldots, x_n, \ldots, x_m$.

The transformation step performs predetermined transformation on each of the provided integer sequence $x_1, x_2, \ldots, x_n, \ldots, x_m$ to acquire a sequence of integers $y_1, y_2, \ldots, y_n, \ldots, y_m$ of w bits.

The rotation step acquires a number of rotation bits from the sequence of integers $y_{n+1}, \ldots, y_m$, performs a rotation operation on the acquired number of rotation bits with respect to all of or a part of the sequence of integers $y_1, y_2, \ldots, y_n, \ldots, y_m$ taken as a bit sequence of wm bits, and acquires a sequence of integers $z_1, z_2, \ldots, z_n, \ldots, z_m$ of w bits from the acquired bit sequence of wm bits.

The updating step provides the transformation step with the sequence of integers $z_1, z_2, \ldots, z_n, \ldots, z_m$ as the integer sequence $x_1, x_2, \ldots, x_n, \ldots, x_m$.

The output step outputs a sequence of integers $z_1, z_2, \ldots, z_n$ or $z_{n+1}, \ldots, z_m$ obtained last as a random sequence $r_1, r_2, \ldots, r_n$ or $r_1, \ldots, r_{m-n}$ respectively in case where transformation in the transformation step and rotation in the rotation step are repeated a predetermined number of times.

In the random sequence generating method, the transformation step can perform transformation by recursion formulae given below for an integer i ($1 \leq i \leq m-1$) using mapping $g(\bullet, \bullet)$ $$y_1 = g(x_m, x_1)$$

$$y_{i+1} = g(x_i, x_{i+1}).$$

Alternatively, in the random sequence generating method, the transformation step can perform transformation by recursion formulae given below for an integer i ($1 \leq i \leq m-1$) using a predetermined integer c and mapping $g(\bullet, \bullet)$ $$y_1 = g(c, x_1)$$

$$y_{i+1} = g(y_i, x_{i+1}).$$

In the random sequence generating method, the transformation step also can perform transformation by recursion formulae given below for an integer i ($1 \leq i \leq m-1$) using mapping $g(\bullet, \bullet)$ $$y_1 = g(c, x_1)$$

$$y_{i+1} = g(x_i, x_{i+1}).$$

In any of the random sequence generating methods, the mapping $g(\bullet, \bullet)$ can be defined as $$g(a, b) = 2b^2 + h(a)b + q \pmod{2^w}$$

from predetermined mapping $h(\bullet)$ and a predetermined integer q ($0 \leq q \leq 2^{w-1}$).

In the random sequence generating method, the mapping $h(\bullet)$ can be defined as $$h(a) = a.$$

In the random sequence generating method, the mapping $h(\bullet)$ can be defined by an operation of clearing a predetermined bit in a numerical expression of a given value.

In the random sequence generating method, the mapping $h(\bullet)$ can be defined by an operation of inverting a predetermined bit in a numerical expression of a given value.

In the random sequence generating method the mapping $h(\bullet)$ can be defined by an operation of setting 01 to least significant two bits in a numerical expression of a given value.

In any one of the random sequence generating methods, taking the sequence of integers $y_{n+1}, \ldots, y_m$ as a bit sequence of w(m−n) bits, the rotation step can acquire, as the number of rotation bits, an integer value equivalent to a bit sequence taken as an integer and obtained by arranging at least one bit at a predetermined position extracted from the bit sequence.

In the random sequence generating method, taking the sequence of integers $y_{n+1}, \ldots, y_m$ as a bit sequence of w(m−n) bits, the rotation step can determine a direction of rotation based on a value of a bit at a predetermined position in the bit sequence.

In any one of the random sequence generating methods, the rotation step can acquire a number of rotation bits from the sequence of integers $y_{n+1}, \ldots, y_m$, can perform a rotation operation on the acquired number of rotation bits with respect to the sequence of integers $y_1, y_2, \ldots, y_n, \ldots, y_m$ taken as a bit sequence of wn bits, can acquire a sequence of integers $z_1, z_2, \ldots, z_n$ of w bits from the acquired bit sequence of wn bits, can perform a rotation operation on the acquired number of rotation bits with respect to the sequence of integers $y_{n+1}, \ldots, y_m$ taken as a bit sequence of w(m−n) bits, and can acquire a sequence of integers $z_{n+1}, \ldots, z_m$ of w bits from the acquired bit sequence of w(m−n) bits.

According to the fourth aspect of the invention, there is provided an encryption/decryption method comprising a random sequence generating step, a message receiving step and an encryption/decryption step, which are designed as follows.

The random sequence generating step generates a random sequence $r_1, r_2, \ldots, r_n$ by means of the aforementioned random sequence generating apparatus.

The message receiving step receives a sequence of integers $p_1, P_2, \ldots$ of w bits as a message.

The encryption/decryption step outputs a sequence of integers $p_1$ xor $r_1$, $p_2$ xor $r_2, \ldots, p_i$ xor $r_{((i+n-1) \bmod n)+1}$ as a result of encryption or decryption According to the fifth aspect of the invention, there is provided a program which allows a computer to function as the aforementioned random sequence generating apparatus or encryption/decryption apparatus or to execute the aforementioned random sequence generating method or encryption/decryption method Those programs may be recorded in a computer readable information recording medium, such as a compact disk, a flexible disk, a hard disk, a magneto-optical disk, a digital video disk, a magnetic tape or a semiconductor memory.

Each of the programs can be distributed and sold, independently of a computer on which the program is run, through a computer communication network. The computer readable information recording medium can be distributed and sold, independently of that computer.

BRIEF DESCRIPTION OF THE DRAWINGS

These objects and other objects and advantages of the present invention will become more apparent upon reading of the following detailed description and the accompanying drawings in which:

FIG. 6 is an exemplary diagram illustrating the schematic structures of an encryption apparatus and a decryption apparatus.

DETAILED DESCRIPTION OF THE PREFERRED EMBODIMENT

A preferred embodiment of the invention is described below with reference to the accompanying drawings. The embodiment described below is illustrative and does not restrict the scope of the invention. Therefore, those skilled in the art can employ embodiments in which those elements or are individually or entirely replaced with their equivalent elements, and which are also included in the scope of the invention.

Embodiment

In one embodiment of the invention to be discussed below, to generate a sequence of "random numbers numerically expressed by w bits", mapping $g(\bullet, \bullet)$ which is defined as $g(a, b) = 2b^2 + h(a)b + q \pmod{2^w}$ using predetermined mapping $h(\bullet)$ and a predetermined integer q ($0 \leq q \leq 2^{w-1}$) is used as non-linear transformation on a finite field.

The embodiment may employ the following operation which clears a predetermined bit in a numerical expression of a given value a by using a predetermined mask value MASK:

$h(a) = a$ and MASK.

The embodiment may also employ the following operation which inverts a predetermined bit in the numerical expression of the given value a:

$h(a) = a$ xor MASK

Further, the embodiment may employ the following operation which sets 01 to least significant two bits in the numerical expression of the given value a.

$h(a) = (a$ and (not 3)) or 1.

In the above operations, the individual operators correspond to the numerical expressions (integer expressions) of the value a; specifically, "and" corresponds to a bit AND, "xor" corresponds to bit exclusive OR, "not" corresponds to bit inversion (bit NOT) and "or" bit OR.

Therefore, those operations can be accomplished using just what is prepared for an integer operation for w bits and without a particular consideration on the carry-over and carry-under in a computer.

It is desirable that the value of w should have a bit width of a machine word prepared in a CPU (Central Processing Unit) in the computer or a smaller width.

RC6 which is said to be one of the fastest block encryption techniques at the present is achieved by using non-linear transformation on a finite field:

$f(x) = 2x^2 + x \pmod{2^w}$ but a random sequence generated from a seed always differs from a random sequence generated from a different seed (one to one mapping) and the maximum period of the random sequence to be generated is $2^{w-1}$.

The mapping $g(\bullet, \bullet)$ which is used in this embodiment is further generalization of the non-linear transformation on a finite field employed in the RC6 and is capable of generating a random sequence equivalent to a random sequence generated by the RC6 when using $g(\bullet, \bullet)$ with $h(a) = 1$ and $q = 0$.

As mapping different from what is equivalent to the mapping of RC6 can be selected in the invention, multifarious variations of random numbers can be acquired.

It is proved through experiments that favorable random sequences even when other operations and values are selected.

Figure 1:
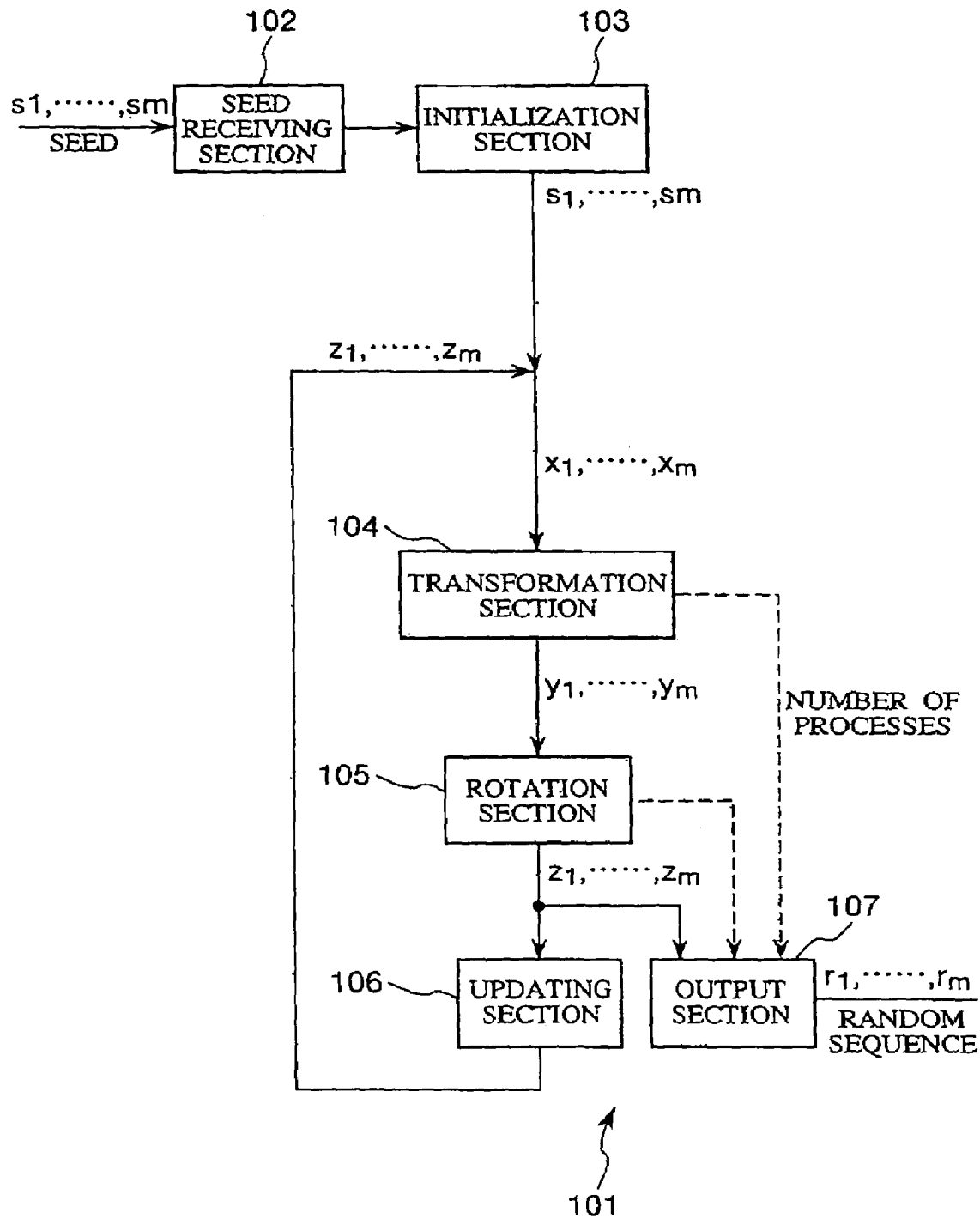
FIG. 1 is an exemplary diagram illustrating the schematic structure of a random sequence generating apparatus according to one embodiment of the invention.
Figure 2:
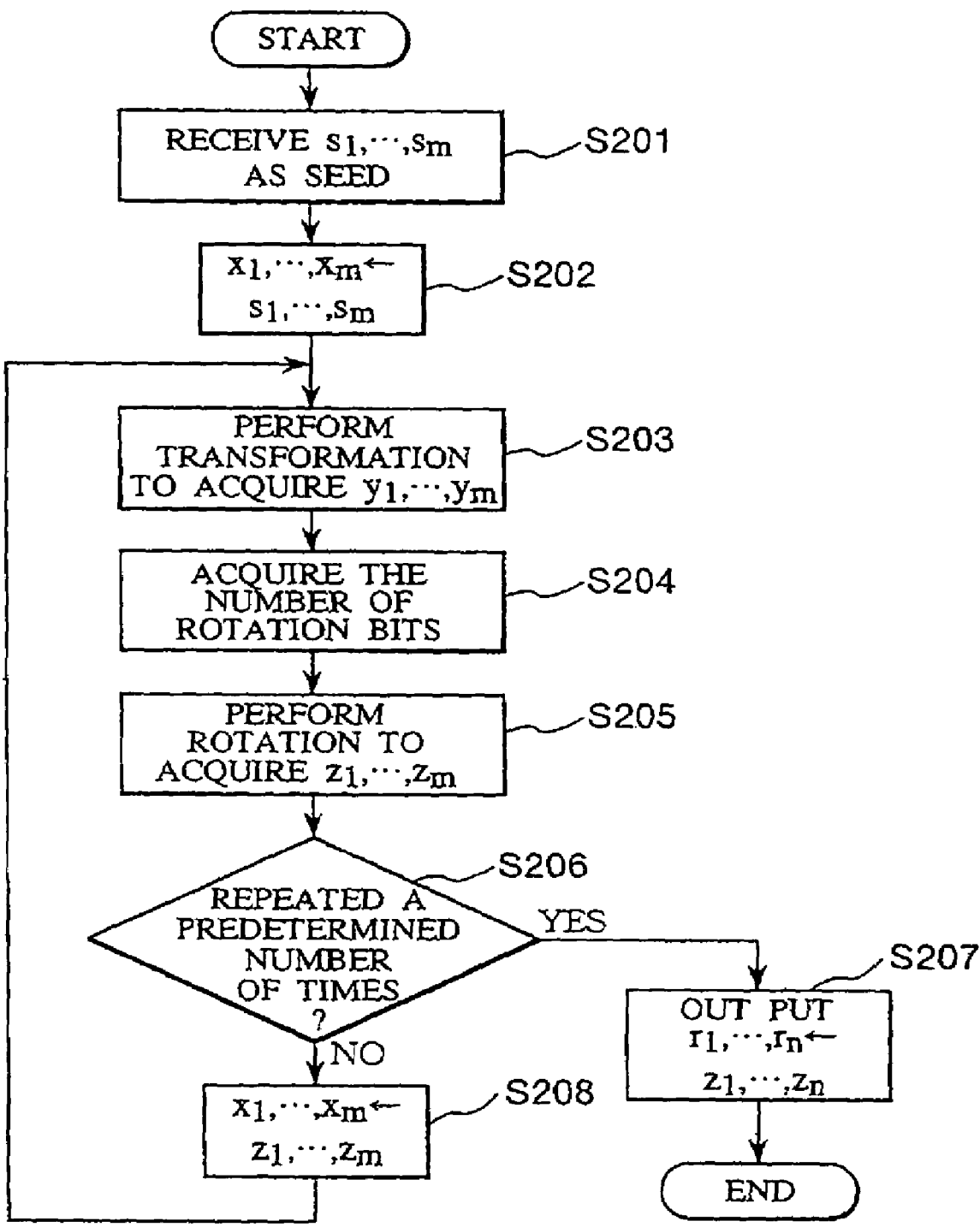
FIG. 2 is a flowchart illustrating the flow of control of a random sequence generating routine to be executed by the random sequence generating apparatus of the embodiment.

FIG. 1 is an exemplary diagram illustrating the schematic structure of a random sequence generating apparatus according to the embodiment. FIG. 2 is a flowchart illustrating the flow of control of a random sequence generating routine to be executed by the random sequence generating apparatus of the embodiment. Referring to those diagrams, the embodiment is discussed in detail below.

A random sequence generating apparatus 101 generates a sequence of integers of w bits and comprises a seed receiving section 102, an initialization section 103, a transformation section 104, a rotation section 105, an updating section 106 and an output section 107.

The seed receiving section 102 in the random sequence generating apparatus 101 receives a sequence of integers $s_1, s_2, \ldots, s_n, \ldots, s_m$ of w bits as a seed (step S201) where $1 \leq n \leq m-1$.

While the sequence of integers $s_1, s_2, \ldots, s_n, \ldots, s_m$ is stored in a memory, such as RAM (Random Access Memory), provided in the random sequence generating apparatus typically, it may be stored in a cache in the CPU or may be temporarily stored in a readable and writable external recording medium, such as a hard disk.

Then, the initialization section 103 provides the transformation section 104 with the received sequence of integers $s_1, s_2, \ldots, s_n, \ldots, s_m$ as an integer sequence $x_1, x_2, \ldots, x_n, \ldots, x_m$ (step S202).

The integer sequence $x_1, x_2, \ldots, x_n, \ldots, x_m$ is likewise stored in a memory such as RAM. In this case, the process that is executed by the initialization section 103 can be accomplished by transferring a value from the memory corresponding to $s_1, s_2, \ldots, s_n, \ldots, s_m$ to the memory corresponding to $x_1, x_2, \ldots, x_n, \ldots, x_m$.

Further, the transformation section 104 performs transformation, defined by the non-linear transformation $g(\bullet, \bullet)$, on each of the provided integer sequence $x_1, x_2, \ldots, X_n, \ldots, x_m$ to acquire a sequence of integers $y_1, y_2, \ldots, y_n, \ldots, y_m$ of w bits (step S203).

As the transformation, transformations defined by the following recursion formulae are available.

(1) Recursion formula given below for an integer i ($1 \leq i \leq m-1$):

$$y_1 = g(x_m, x_1)$$

$$y_{i+1} = g(x_i, x_{i+1}).$$

(2) Recursion formulae given below for an integer i ($1 \leq i \leq m-1$) using a predetermined integer c and mapping $g(\bullet, \bullet)$ $$y_1 = g(c, x_1)$$

$$y_{i+1} = g(y_i, x_{i+1}).$$

(3) Recursion formulae given below for an integer i ($1 \leq i \leq m-1$) using mapping $g(\bullet, \bullet)$.

$$y_1 = g(c, x_1)$$

$$y_{i+1} = g(x_i, x_{i+1}).$$

Those computations can be accomplished by using an ALU (Arithmetic Logic Unit) provided in the CPU. The sequence of integers $y_1, y_2, \ldots, y_n, \ldots, y_m$ is likewise stored in a memory or so.

The rotation section 105 acquires the number of rotation bits from the sequence of integers $y_{n+1}, \ldots, y_m$ (step S204). The following are available schemes for acquiring the number of rotation bits.

Figure 3:
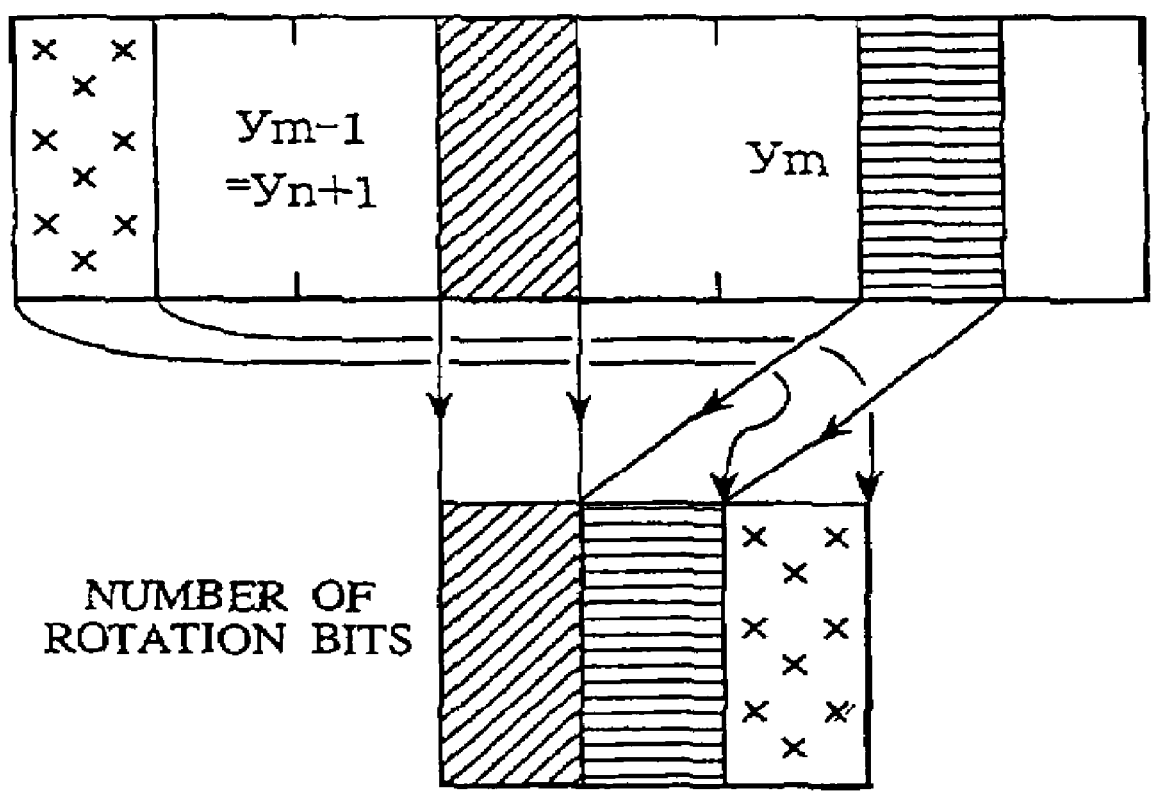
FIG. 3 is an explanatory diagram illustrating how to acquire the number of rotation bits in a rotation section in the random sequence generating apparatus of the embodiment.

Taking $y_{n+1}, \ldots, y_m$ as a bit sequence, bits at predetermined bit positions are arranged in order and the resultant value is taken again as an integer value. FIG. 3 shows how to acquire an integer value from values at predetermined bit positions when w=4 and m-n=2. In the illustrated example, three bits are extracted from a random sequence of eight bits.

There are eight integer values 0 to 7 (in case of sign-less integer values) obtained from three bits. In this case, the direction of rotation employed is a "predetermined direction (rightward or leftward)" and the integer value to be obtained is treated directly as the number of rotation bits.

In an alternative case where one bit represents a sign (associated with a positive or negative sign) and the amount of rotation is acquired from the remaining two bits, the value may be rotated leftward in case of the positive sign or rightward in case of the negative sign by the number of bits of the absolute value.

Then, the rotation section 105 performs a predetermined rotation operation on the acquired number of rotation bits with respect to all of or a part of the sequence of integers $y_1, y_2, \ldots, y_n, \ldots, y_m$ taken as a bit sequence of wm bits, and acquires a sequence of integers $z_1, z_2, \ldots, z_n, \ldots, z_m$ of w bits from the acquired bit sequence of wm bits (step S205).

The following rotation operations can be used as the predetermined rotation operation.

Figure 4:
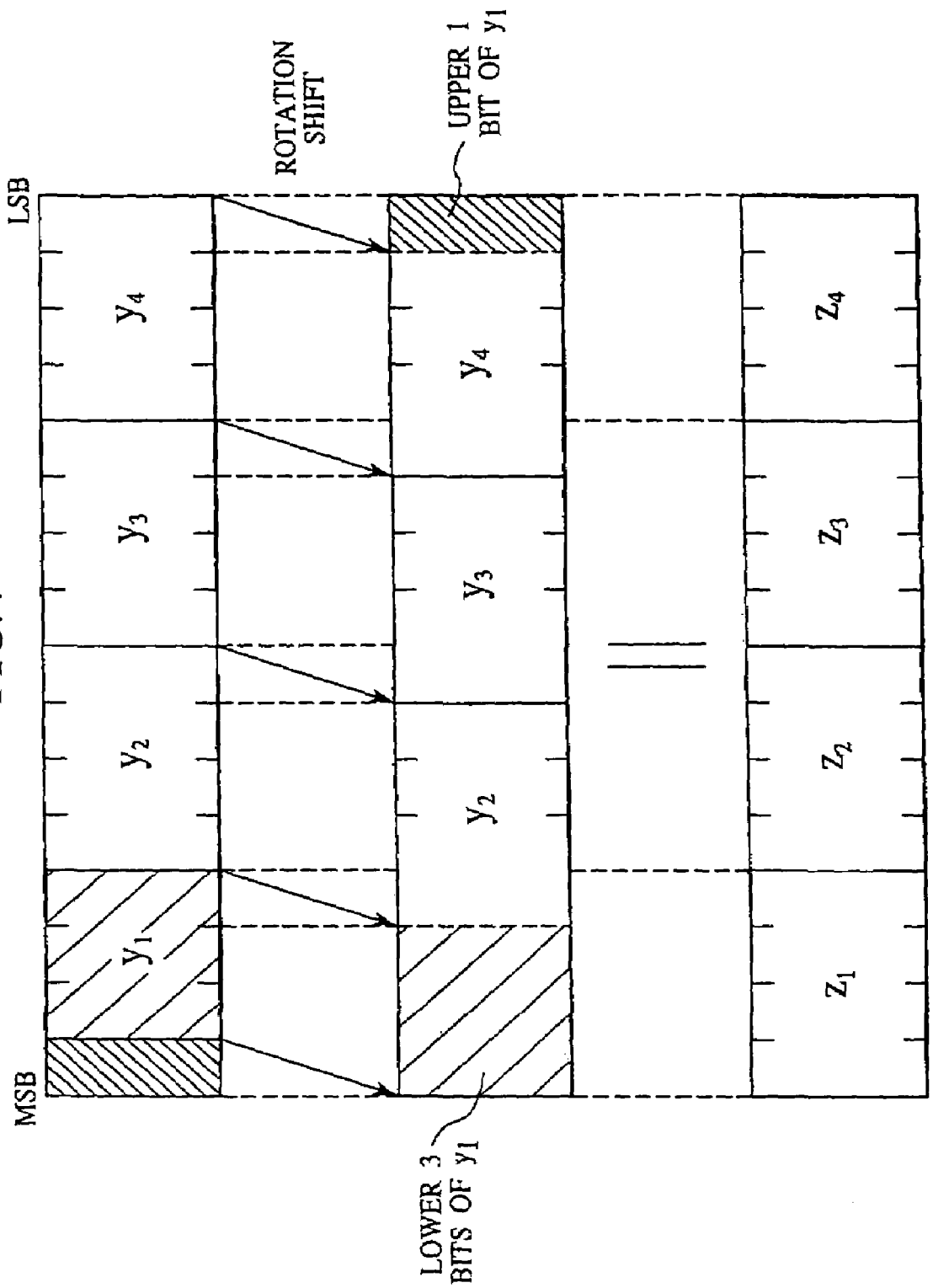
FIG. 4 is an explanatory diagram illustrating how to perform a rotation operation in the rotation section in the random sequence generating apparatus of the embodiment.

(1) A bit sequence of wn bits is cyclically shifted by the obtained number of rotation bits. FIG. 4 shows the schematic structure in case where w=4 and n=4 and $y_1, y_2, \ldots, y_4$ are arranged in big endian and are shifted leftward by one bit as the cyclic shifting. This is a rotation operation to rotate a part of a bit sequence of wm bits.

(2) The entire bit sequence of wm bits is cyclically shifted by the obtained number of rotation bits. The entire bit sequence of wm bits should be cyclically shifted in a manner similar to the rotation of the bit sequence of wn bits in FIG. 4.

(3) Cyclic shifting of a bit sequence of wn bits in $y_1, \ldots, y_n$ by the obtained number of rotation bits or cyclic shifting of a bit sequence of w(m-n) bits in $y_1, \ldots, y_n$ by the obtained number of rotation bits.

Those schemes can be achieved by cyclically shifting all or a part of $y_1, y_2, \ldots, y_n, \ldots, y_m$ stored in the memory or so in a bit width unit natural to the CPU while considering the carry-over and carry-under. In this case, $z_1, z_2, \ldots, z_n, \ldots, Z_m$ to be obtained are stored as new values in the area of the memory where $y_1, y_2, \ldots, y_n, \ldots, y_m$ have been stored.

Further, the output section 107 determines whether transformation in the transformation section 104 and rotation in the rotation section 105 have been repeated a predetermined number of times or not (step S206).

The decision in step S206 can be made, for example, by setting a "value for the predetermined number of times" to a counter variable prepared in the memory before step S201, decrementing the value of the counter variable by 1 between step S204 and step S206 and determining whether the value of the counter variable becomes 0 or not.

When the transformation and rotation have been repeated a predetermined number of times (YES in step S206), $z_1, z_2, \ldots, z_n$ acquired last are output as a random sequence $r_1, r_2, \ldots, r_n$ (step S207) after which random sequence generation is terminated.

When the transformation and rotation have not been repeated a predetermined number of times (NO in step S206), those $z_1, z_2, \ldots, z_n$ are given to the transformation section 104 as an integer sequence $x_1, x_2, \ldots, x_n, \ldots, x_m$ (step S208) after which the flow returns to step S203 and transformation (step S203) and rotation (steps S204 and S205) are repeated.

This operation can be accomplished by transferring a value in the memory or so where $z_1, z_2, \ldots, z_n, \ldots, z_m$ are stored to the memory or so where $x_1, x_2, \ldots, x_n, \ldots, x_m$ are stored.

The random sequence generating apparatus 101 has an unillustrated memory section which can be constructed in such a way as to store $s_1, s_2, \ldots, s_n, \ldots, s_m, x_1, x_2, \ldots, x_n, \ldots, x_m, y_1, y_2, \ldots, y_n, \ldots, y_m, z_1, z_2, \ldots, z_n, \ldots, z_m, r_1, r_2, \ldots, r_n$ and so forth in different areas or in the same area (e.g., $y_1, y_2, \ldots, y_n, \ldots, y_m, z_1, z_2, \ldots, z_n, \ldots, z_m$, etc.) through analysis of the dependency of usages of the values. The individual sections exchange computed values to one another using the common memory.

Figure 5:
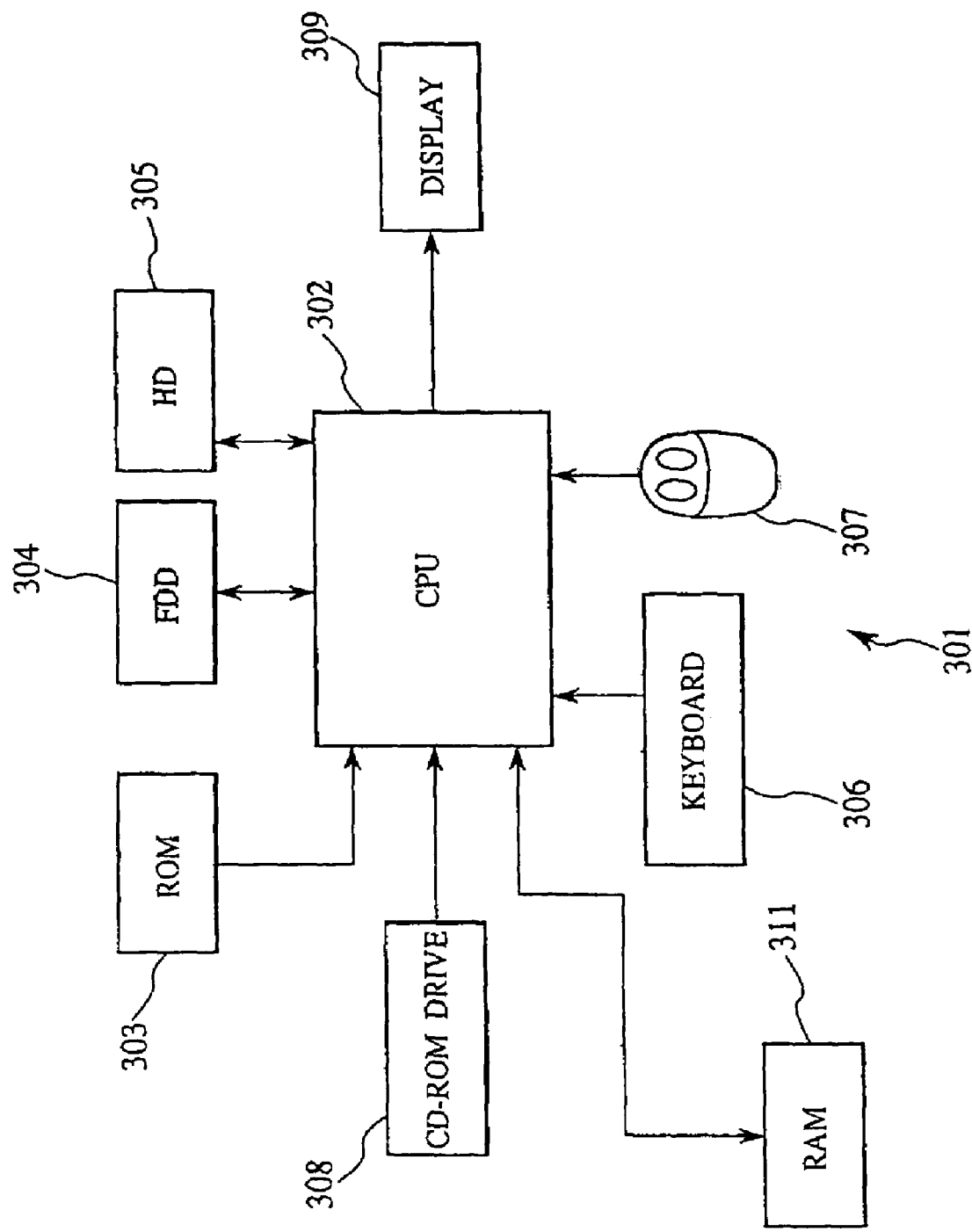
FIG. 5 is an exemplary diagram illustrating the typical schematic structure of a computer which realizes the random sequence generating apparatus according to the embodiment.

FIG. 5 is an exemplary diagram illustrating the typical schematic structure of a computer which realizes the random sequence generating apparatus 101 according to the embodiment The structure is described by referring to FIG. 5.

A computer 301 is controlled by a CPU 302. When the computer 301 is powered on, the CPU 302 executes an IPL (Initial Program Loader) prepared in a ROM (Read Only Memory) 303.

The execution of the IPL loads an OS (Operating System) recorded in a flexible disk loaded into a flexible disk drive 304 or a hard disk 305 or so, making the computer 301 ready for receiving various instructions input by a user.

The user manipulates a keyboard 306 or a mouse 307 to input various instructions to the computer 301.

In accordance with the input, the OS causes the CPU 302 to execute a program recorded in the hard disk 305 or a CD-ROM (Compact Disk ROM) loaded into a CD-ROM drive 308 and process various kinds of data recorded therein, and displays the progress or result of the processing on a display 309.

The CPU 302 uses a RAM 311 as a temporary memory area. The RAM 311 is used to store various sequence of numbers to be used in computation as mentioned above.

Further, the CPU 302 can save information the result of processing a generated random sequence and progress of the processing in the hard disk 305 during execution of the program.

An operation in this embodiment can be reduced to simple bit operations as mentioned above. Therefore, the random sequence generating apparatus 101 can be constructed by combining exclusive electronic circuits (adder, subtracter, shifter, latch, etc.) or using an electronic component whose circuit structure can be changed variably, such as an ASIC (Application Specific Integrated Circuit), DSP (Digital Signal Processor) or FPGA (Field Programmable Gate Array). Those modes are included in the scope of the invention.

(Results of Experiment)

Random sequences were generated from the following data using the random sequence generating apparatus 101 according to the embodiment:

$$w=32$$

$$n=32 \text{ and}$$

$$g(a, b)=2b^2+h(a)b$$

where mapping $h(\bullet)$ is defined by an operation which sets 01 to the least significant two bits in the numerical expression of the given value.

Further, each of transformation and rotation was done once per round. That is, the "predetermined number of times" is one.

A random sequence to be output is $r_1, r_2, \ldots, r_{1024}$ consisting of a total of wn=1024 bits.

20000×89999 types of seeds were given to this random sequence to output the random sequence $r_1, r_2, \ldots, r_{1024}$ 20000×89999 rounds.

Of FIPS 140-1 and FIPS 140-2, standard tests of checking the randomness of a random sequence, the randomness checking test which would meet the standard security specification was applied to individual bit positions in the random sequence of 1024 bits to test the property of the random sequence generated by the embodiment In those tests, a bit sequence of 20000 bits were extracted from the individual bit positions and the following processes were performed on the bit sequence of 20000 bits.

Monobit test which checks whether the frequency of occurrence of the value of a bit at a predetermined position is lopsided or not Poker test which divides 20000 bits to 5000 patterns each of four bits and checks whether the frequency of occurrence of the 4-bit pattern is lopsided or not Runs test which checks whether the frequency of occurrence of a run of a predetermined length extracted from a random sequence is lopsided or not.

Long runs test which is similar to the runs test but negates randomness when there are 34 or more runs in case of the FIPS 140-1 and negates randomness when there are 26 or more runs in case of the FIPS 140-2.

The results of the experiment showed that in the FPS 140-1, the sequence of 20000 bits in every one of the generated 1024 (bits)×89999 samples passed the set standards.

In the FIPS 140-2, 99.92 percent of the sequences of 20000 bits in the generated 1024 (bits)×89999 samples passed the set standards.

The invention was applied to NIST 800-22, a random test severer than the aforementioned random tests, to check the randomness. The results showed that the use of the rotation scheme (3) could provide extremely favorable random numbers.

As this algorithm was installed onto the FPGA of Vertex xcv 1000 (100,000,000 system gates), a product of XILINX (trademark), Inc., a random sequence could be generated at a speed of 25.62 Gbits/sec due to the parallel processing of the algorithm. That is, the installation of the algorithm onto hardware, such as an FPGA can bring about a significant merit on improving the speed.

In short, it was proved that random sequences generated by the embodiment had an extremely favorable property, would be effective in the field of encryption for privacy communications and the field of simulation of physical phenomena, chemical phenomena or so and would be remarkably effective to output random sequences with a good randomness from hardware at a high speed.

(Encryption/Decryption Apparatus)

Encryption and decryption can be accomplished by using the above-described random sequence generating apparatus. FIG. 6 is an exemplary diagram illustrating the schematic structures of an encryption apparatus and a decryption apparatus which perform such encryption and decryption.

An encryption apparatus 601 and a decryption apparatus 651 use $s_1, s_2, \ldots, s_n, \ldots, s_m$ as a common key. Then, a generating section 602 in the encryption apparatus 601 and a generating section 652 in the decryption apparatus 651 have random sequence generating apparatuses 201 with the same structure (same computation scheme) and receive the common key $s_1, s_2, \ldots, s_n, \ldots, s_m$ as an input. Then, both generating sections 602 and 652 generate the same random numbers $r_1, \ldots, r_n$.

In the encryption apparatus 601, an XOR section 604 transforms an integer sequence hd 1, $p_2, \ldots$ of a transmission message, received by a message receiving section 603, to $p_1$ xor $r_1$, $p_2$ xor $r_2, \ldots, p_i$ xor $r_{((i+n-1) \bmod n)+1}$ using the random numbers and outputs the result as an integer sequence $e_1, e_2, \ldots, e_i, \ldots$ of the encrypted message where "xor" means the aforementioned exclusive OR and "a mod n" means the remainder of division of a by n.

A message receiving section 653 in the decryption apparatus 651 receives the integer sequence $e_1, e_2, \ldots, e_i, \ldots$ of the encrypted message and an XOR section 654 transforms the integer sequence to $e_1$ xor $r_1$, $e_2$ xor $r_2, \ldots, e_i$ xor $r_{((i+n-1) \bmod n)+1}$ and outputs the result as an integer sequence $f_1, f_2, f_1, \ldots$ of the encrypted message.

As $$f_i = e_i \text{ xor } r_{((i+n-1) \bmod n)+1}$$
$$= (p_i \text{ xor } r_{((i+n-1) \bmod n)+1}) \text{ xor } r_{((i+n-1) \bmod n)+1}$$
$$= p_i,$$

the integer sequence of the encrypted transmission message is identical to the integer sequence of the original transmission message, which is the proof that encryption and decryption can be done properly.

The length of a message to be processed can be set to n or less. In this case, $((i+n-1) \bmod n)+1$ can be replaced with i. This can make the confidentiality higher than the repetitive use of the same random sequence.

Because the encryption apparatus 601 and the decryption apparatus 651 have quite the same structure, one apparatus with the structure can be used as the encryption apparatus 601 in one case and as the decryption apparatus 651 in some other case.

As described above specifically, the invention can provide a random sequence generating apparatus and random sequence generating method, which generate a sequence of random numbers having a preferably property as a random sequence, an encryption/decryption apparatus and encryption/decryption method which uses the random sequence generating apparatus and method, and a program which achieves those apparatuses and methods using a computer.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-75438 filed on Mar. 19, 2003 and including specification, claims, drawings and summary. The disclosure of the above Japanese Patent Application is incorporated herein by reference in its entirety.

What is claimed is:

1. A random sequence generating apparatus for generating a sequence of integers of w bits, comprising:
   a seed receiving section which receives a sequence of integers $s_1, s_2, \ldots, s_n, \ldots, s_m$ of w bits as a seed for integers n and m ($1 \leq n \leq m-1$);
   an initialization section which provides a transformation section with said received sequence of integers $s_1, s_2, \ldots, s_n, \ldots$, sm as an integer sequence $x_1, x_2, \ldots, x_n, \ldots, x_m$;
   said transformation section which performs predetermined transformation on each of said provided integer sequence $x_1, x_2, \ldots, x_n, \ldots, x_m$ to acquire a sequence of integers $y_1, y_2, \ldots, y_n, \ldots, y_m$ of w bits;
   a rotation section which acquires a number of rotation bits from said sequence of integers $y_{n+1}, \ldots, y_m$, performs a rotation operation on said acquired number of rotation bits with respect to all of or a part of said sequence of integers $y_1, y_2, \ldots, y_n, \ldots, y_m$ taken as a bit sequence of wm bits, and acquires a sequence of integers $z_1, z_2, \ldots, z_n, \ldots, z_m$ of w bits from said acquired bit sequence of wm bits;
   an updating section which provides said transformation section with said sequence of integers $z_1, z_2, \ldots, z_n, \ldots, z_m$ as said integer sequence $x_1, x_2, \ldots, x_n, \ldots, x_m$; and
   an output section which outputs a sequence of integers $z_1, z_2, \ldots, z_n$ or $z_{n+1}, \ldots, z_m$ obtained last as a random sequence $r_1, r_2, \ldots, r_n$ or $r_1, \ldots, r_{m-n}$ respectively in case where transformation in said transformation section and rotation in said rotation section are repeated a predetermined number of times,
   a mapping $g(\bullet, \bullet)$ defined as $$g(a, b) = 2b^2 + h(a)b + q (\bmod 2^w)$$

with $h(\bullet)$ being a predetermined mapping and q being a predetermined integer ($0 \leq q \leq 2^{w-1}$), the mapping $h(\bullet)$ being defined by an operation of setting 01 to least significant two bits in a numerical expression of a given value,
   wherein the transformation section performs the predetermined transformation by the following recursion formulae for an integer i ($1 \leq i \leq m-1$):

$$y_1 = g(x_m, x_1),$$

$$y_{i+1} = g(x_i, x_{i+1}),$$

wherein the transformation section performs the predetermined transformation by the following recursion formulae for an integer i ($1 \leq i \leq m-1$) and a predetermined integer c:

$$y_1 = g(c, x_1),$$

$$y_{i+1} = g(y_i, x_{i+1}),$$

or
   wherein the transformation section performs the predetermined transformation by the following recursion formulae for an integer i ($1 \leq i \leq m-1$) and a predetermined integer c:

$$y_1 = g(c, x_1),$$

$$y_{i+1} = g(x_i, x_{i+1}).$$

2. The random sequence generating apparatus according to claim 1, wherein said mapping $h(\bullet)$ is defined by an operation of inverting a predetermined bit in a numerical expression of a given value instead of the operation of setting 01 to the least significant two bits.

3. The random sequence generating apparatus according to claim 1, wherein taking said sequence of integers $y_{n+1}, \ldots, y_m$ as a bit sequence of w(m−n) bits, said rotation section acquires, as said number of rotation bits, an integer value equivalent to a bit sequence taken as an integer and obtained by arranging at least one bit at a predetermined position extracted from said bit sequence.

4. The random sequence generating apparatus according to claim 3, wherein taking said sequence of integers $y_{n+1} \ldots, y_m$ as a bit sequence of w(m−n) bits, said rotation section determines a direction of rotation based on a value of a bit at a predetermined position in said bit sequence.

5. The random sequence generating apparatus according to claim 1, wherein said rotation section acquires a number of rotation bits from said sequence of integers $y_{n+1}, \ldots, y_m$, performs a rotation operation on said acquired number of rotation bits with respect to said sequence of integers $y_1, y_2, \ldots, y_n, \ldots, y_m$ taken as a bit sequence of wn bits, acquires a sequence of integers $z_1, z_2, \ldots, z_n$ of w bits from said acquired bit sequence of wn bits, performs a rotation operation on said acquired number of rotation bits with respect to said sequence of integers $y_{n+1}, \ldots, y_m$ taken as a bit sequence of w(m−n) bits, and acquires a sequence of integers $z_{n+1}, \ldots, z_m$ of w bits from said acquired bit sequence of w(m−n) bits.

6. An encryption/decryption apparatus comprising:
   a random sequence generating section which generates a random sequence $r_1, r_2, \ldots, r_n$ by a random sequence generating apparatus recited in claim 1;
   a message receiving section which receives a sequence of integers $p_1, p_2, \ldots, p_i, \ldots$ of w bits as a message; and
   an encryption/decryption section which outputs a sequence of integers $p_1$ xor $r_1$, $p_2$ xor $r_2$, ..., $p_i$ xor $r_{((i+n-1) \bmod n)+1}$, ... as a result of encryption or decryption.

7. A random sequence generating method executed by a random sequence generating apparatus having a seed receiving section, an initializing section, a transformation section, a rotation section, an updating section, and an output section for generating a sequence of integers of w bits, said random sequence generating method comprising:
   a seed receiving step in which said receiving section receives a sequence of integers $s_1, s_2, \ldots, s_n, \ldots, s_m$ of w bits as a seed for integers n and m ($1 \leq n \leq m-1$);
   an initialization step in which said initializing section provides a transformation step with said received sequence of integers $s_1, s_2, \ldots, s_n, \ldots, s_m$ as an integer sequence $x_1, x_2, \ldots, x_n, \ldots, x_m$;
   said transformation step in which said transformation section performs predetermined transformation on each of said provided integer sequence $x_1, x_2, \ldots, x_n, \ldots, x_m$ to acquire a sequence of integers $y_1, y_2, \ldots, y_n, \ldots, y_m$ of w bits;
   a rotation step in which said rotation section acquires a number of rotation bits from said sequence of integers $y_{n+1}, \ldots, y_m$, performs a rotation operation on said acquired number of rotation bits with respect to all of or a part of said sequence of integers $y_1, y_2, \ldots, y_n, \ldots, y_m$ taken as a bit sequence of wm bits, and acquires a sequence of integers $z_1, z_2, \ldots, z_n, \ldots, z_m$ of w bits from said acquired bit sequence of wm bits;
   an updating step in which said updating section provides said transformation step with said sequence of integers $z_1, z_2, \ldots, z_n, \ldots, z_m$ as said integer sequence $x_1, x_2, \ldots, x_n, \ldots, x_m$; and
   an output step in which said output section outputs a sequence of integers $z_1, z_2, \ldots, z_n$ or $z_{n+1}, \ldots, z_m$ obtained last as a random sequence $r_1, r_2, \ldots, r_n$ or $r_1, \ldots, r_{m-n}$ respectively in case where transformation in said transformation step and rotation in said rotation step are repeated a predetermined number of times,
   a mapping $g(\bullet, \bullet)$ defined as $$g(a, b) = 2b^2 + h(a)b + q \pmod{2^w}$$

with $h(\bullet)$ being a predetermined mapping and q being a predetermined integer ($0 \leq q \leq 2^{w-1}$), the mapping $h(\bullet)$ being defined by an operation of setting 01 to least significant two bits in a numerical expression of a given value,
   wherein the transformation section performs the predetermined transformation by the following recursion formulae for an integer i ($1 \leq i \leq m-1$):

$$y_1 = g(x_m, x_1),$$

$$y_{i+1} = g(x_i, x_{i+1}),$$

wherein the transformation section performs the predetermined transformation by the following recursion formulae for an integer i ($1 \leq i \leq m-1$) and a predetermined integer c:

$$y_1 = g(c, x_1),$$

$$y_{i+1} = g(y_i, x_{i+1}),$$

or
   wherein the transformation section performs the predetermined transformation by the following recursion formulae for an integer i ($1 \leq i \leq m-1$) and a predetermined integer c:

$$y_1 = g(c, x_1),$$

$$y_{i+1} = g(x_i, x_{i+1}).$$

8. The random sequence generating method according to claim 7, wherein said mapping $h(\bullet)$ is defined by an operation of inverting a predetermined bit in a numerical expression of a given value instead of the operation of setting 01 to the least significant two bits.

9. The random sequence generating method according to claim 7, wherein taking said sequence of integers $y_{n+1}, \ldots, y_m$ as a bit sequence of w(m−n) bits, said rotation step acquires, as said number of rotation bits, an integer value equivalent to a bit sequence taken as an integer and obtained by arranging at least one bit at a predetermined position extracted from said bit sequence.

10. The random sequence generating method according to claim 9, wherein taking said sequence of integers $y_{n+1}, \ldots, y_m$ as a bit sequence of w(m−n) bits, said rotation step determines a direction of rotation based on a value of a bit at a predetermined position in said bit sequence.

11. The random sequence generating method according to claim 7, wherein said rotation step acquires a number of rotation bits from said sequence of integers $y_{n+1}, \ldots, y_m$, performs a rotation operation on said acquired number of rotation bits with respect to said sequence of integers $y_1, y_2, \ldots, y_n, \ldots, y_m$ taken as a bit sequence of wn bits, acquires a sequence of integers $z_1, z_2, \ldots, z_n$ of w bits from said acquired bit sequence of wn bits, performs a rotation operation on said acquired number of rotation bits with respect to said sequence of integers $y_{n+1} \ldots, y_m$ taken as a bit sequence of w(m−n) bits, and acquires a sequence of integers $z_{n+1}, \ldots, z_m$ of w bits from said acquired bit sequence of w(m−n) bits.

12. An encryption/decryption method executed by an encryption/decryption apparatus having a random sequence generating section, a message receiving section, and an encryption/decryption section, said encryption/decryption method comprising:
   a random sequence generating step in which said random sequence generating section generates a random sequence $r_1, r_2, \ldots, r_n$ by a random sequence generating method recited in claim 7;
   a message receiving step in which said message receiving section receives a sequence of integers $p_1, p_2, \ldots, p_i, \ldots$ of w bits as a message; and
   an encryption/decryption step in which said encryption/decryption section outputs a sequence of integers $p_1$ xor $r_1$, $p_2$ xor $r_2$, ..., $p_i$ xor $r_{((i+n-1) \bmod n)+1}$, ... as a result of encryption or decryption.

13. A computer readable medium recording a program which allows a computer to function as:
   a seed receiving section which receives a sequence of integers $s_1, s_2, \ldots, s_n, \ldots, s_m$ of w bits as a seed for integers n and m ($1 \leq n \leq m-1$);

an initialization section which provides a transformation section with said received sequence of integers $s_1, s_2, \ldots, s_n, \ldots, s_m$ as an integer sequence $x_1, x_2, \ldots, x_n, \ldots, x_m$;

a transformation section which performs predetermined transformation on each of said provided integer sequence to acquire a sequence $x_1, x_2, \ldots, x_n, \ldots, x_m$ to acquire a sequence of integers $y_1, y_2, \ldots, y_n, \ldots y_m$ of w bits;

a rotation section which acquires a number of rotation bits from said sequence of integers $y_{n+1}, \ldots, y_m$ performs a rotation operation on said acquired number of rotation bits with respect to all of or a part of said sequence of integers $y_1, y_2, \ldots, y_n, \ldots, y_m$ taken as a bit sequence of wm bits, and acquires a sequence of integers $z_1, z_2, \ldots, z_n, \ldots, z_m$ of w bits from said acquired bit sequence of wm bits;

an updating section which provides said transformation section with said sequence of integers $z_1, z_2, \ldots, z_n, \ldots, z_m$ as said integer sequence $x_1, x_2, \ldots, x_n, \ldots, x_m$; and an output section which outputs a sequence of integers $z_1, z_2, \ldots, z_n$ or $z_{n+1}, \ldots, z_m$ obtained last as a random sequence $r_1, r_2, \ldots, r_n$ or $r_1, \ldots, r_{m-n}$ respectively in case where transformation in said transformation section and rotation in said rotation section are repeated a predetermined number of times, a mapping $(\bullet, \bullet)$ defined as $$g(a, b) = 2b^2 + h(a)b + q \pmod{2^w}$$

with $h(\bullet)$ being a predetermined mapping and q being a predetermined integer ($0 \leq q \leq 2^{w-1}$), the mapping $h(\bullet)$ being defined by an operation of setting 01 to least significant two bits in a numerical expression of a given value, wherein the transformation section performs the predetermined transformation by the following recursion formulae for an integer i ($1 \leq i \leq m-1$):

$$y_1 = g(x_m, x_1),$$

$$y_{i+1} = g(x_i, x_{i+1}),$$

wherein the transformation section performs the predetermined transformation by the following recursion formulae for an integer i ($1 \leq i \leq m-1$) and a predetermined integer c:

$$y_1 = g(c, x_1).$$

$$y_{i+1} = g(y_i, x_{i+1}),$$

or wherein the transformation section performs the predetermined transformation by the following recursion formulae for an integer i ($1 \leq i \leq m-1$) and a predetermined integer c:

$$y_1 = g(c, x_1),$$

$$y_{i+1} = g(x_i, x_{i+1}).$$

14. The computer readable medium according to claim 13, wherein said mapping $h(\bullet)$ is defined by an operation of inverting a predetermined bit in a numerical expression of a given value instead of the operation of setting 01 to the least significant two bits.

* * * * *